United States Patent [19]
Douglas

[11] 3,995,295
[45] Nov. 30, 1976

[54] ELECTRO-MECHANICAL SHUTTER SYSTEM HAVING MECHANICAL LATCH
[75] Inventor: Lawrence M. Douglas, South Easton, Mass.
[73] Assignee: Polaroid Corporation, Cambridge, Mass.
[22] Filed: Aug. 28, 1975
[21] Appl. No.: 608,663

[52] U.S. Cl. .............................. 354/230; 354/235; 354/247; 354/268
[51] Int. Cl.² .......................................... G03B 9/42
[58] Field of Search ........... 354/230, 266, 268, 234, 354/235, 247, 26, 30

[56] References Cited
UNITED STATES PATENTS
| | | | |
|---|---|---|---|
| 3,832,722 | 8/1974 | Douglas | 354/30 X |
| 3,873,987 | 3/1975 | Braüning | 354/230 X |
| 3,893,134 | 7/1975 | Braüning | 354/30 |
| 3,896,458 | 7/1975 | Johnson et al. | 354/230 X |
| 3,903,538 | 9/1975 | Yoshiyaki | 354/234 |

Primary Examiner—Joseph F. Peters, Jr.
Attorney, Agent, or Firm—David R. Thornton; Edward S. Roman

[57] ABSTRACT

An exposure control system for photographic apparatus utilizing electrically controlled shutter-diaphragm blades and employing a latch, for holding the blades in a light-blocking condition, which is automatically released responsive to actuation of the blades just prior to initiation of an exposure interval during which scene light is passed to the film. In the illustrated embodiment, the blades are initially drawn slightly further in a light-blocking direction from the latched position so as to release the latch just prior to initiation of the exposure interval.

20 Claims, 7 Drawing Figures

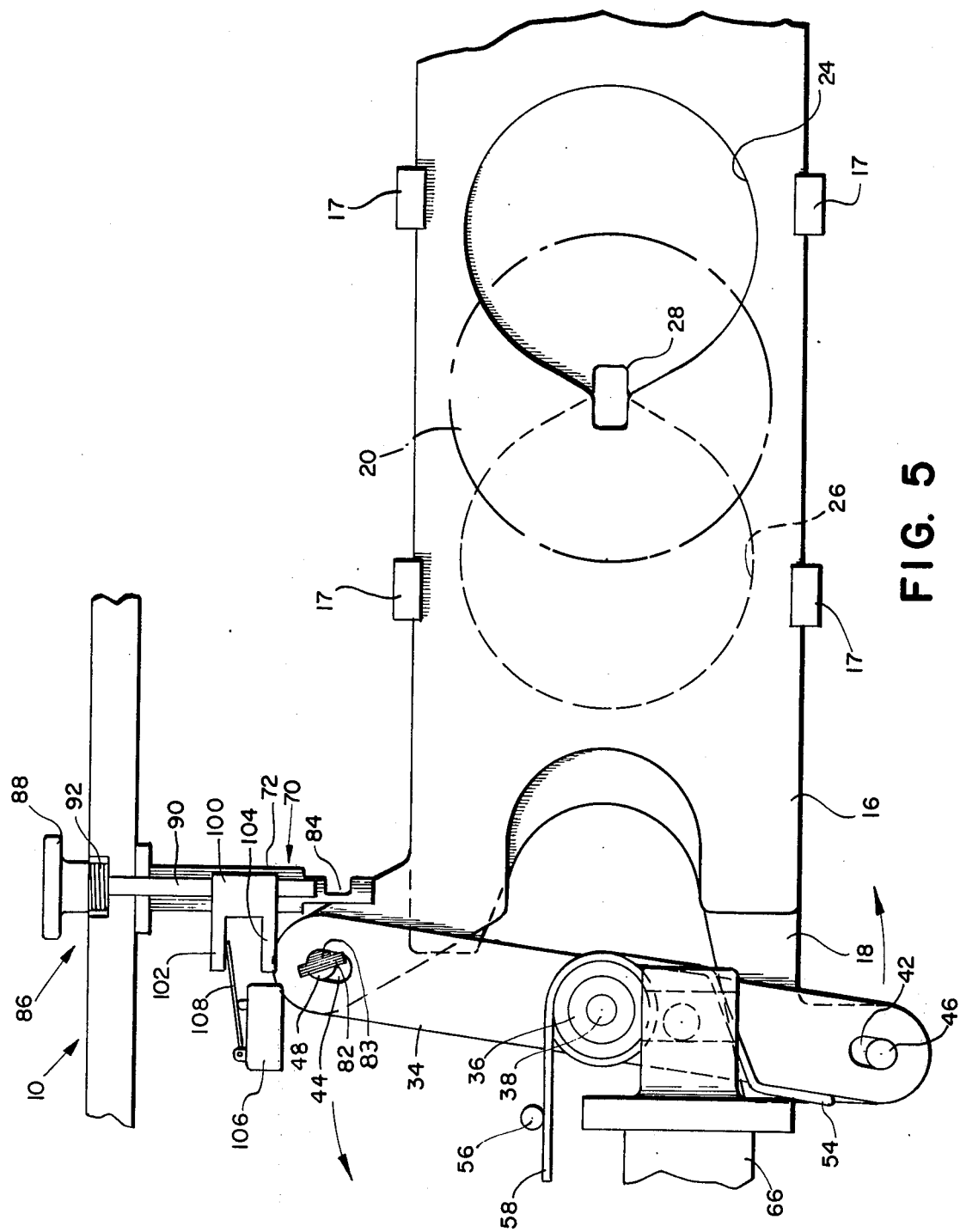

ELECTRO-MECHANICAL SHUTTER SYSTEM HAVING MECHANICAL LATCH

BACKGROUND OF THE INVENTION

This invention relates to photographic exposure control systems and, more particularly, to a automatic exposure control system employing a shutter latching arrangement.

Electrically driven exposure control systems are advantageous in that they minimize operator requirements of shutter recocking, etc. and are particularly suited for electronic control. For conservation of power, such systems require provision of a stable, de-energized shutter condition when the camera apparatus is not undergoing exposure operations. An exemplary system of this type is described in U.S. Pat. No. 3,820,128 issued to John P. Burgarella et al. on June 25, 1974 wherein a compact, automated single lens reflex camera is described, and which includes a shutter-diaphragm system having shutter blades mechanically biased to an open (viewing) position and electrically biased to a closed position. Advantaeously, the exposure system of the above-noted patent is electrically sequenced to provide precise control over the exposure operation. That is, both the initiation and termination of the exposure interval are electrically rather than mechanically determined and, accordingly, may be precisely controlled. However, while this system is particularly adapted for through the lens viewing and provides a normally open shutter, it can be understood that it would also be desirable to provide a normally closed arrangement without compromise in the system advantages.

Consequently, it is an important object of this invention to provide an improved photographic exposure control system.

It is another primary object of this invention to provide an improved electrically driven exposure control system.

It is still another object of this invention to provide an exposure control system having a latched shutter arrangement.

It is a further object of this invention to provide an exposure control system having a latched shutter arrangement releaseable in accordance with electromechanical control.

SUMMARY OF THE INVENTION

In accordance with the general concept, the exposure control system of the invention includes a reliable shutter latching arrangement which requires shutter actuation for release. Thus, in accordance with the invention, the exposure control system includes a shutter latch released in response to a combined mechanical and electrical actuation of the exposure control system. In the illustrated embodiment, a mechanical shutter latch arrangement is unlocked just before or simultaneously with energization of the exposure control system and then subsequently released responsive to initial shutter blade movement resulting from energization of the electrical drive element.

BRIEF DESCRIPTION OF THE DRAWINGS

The novel features that are considered characteristic of the invention are set forth with particularity in the appended claims. The invention itself, however, both as to its organization and its method operation, together with additional objects and advantages thereof will best be understood from the following description of the preferred embodiment when read in connection with the accompanying drawings wherein like numbers have been employed in the different figures to denote the same parts and wherein:

FIG. 5 is a front elevational view of the exposure control mechanism of FIG. 1 showing the orientation of the components thereof during an exposure interval.

DESCRIPTION OF THE PREFERRED EMBODIMENT

Figure 1:
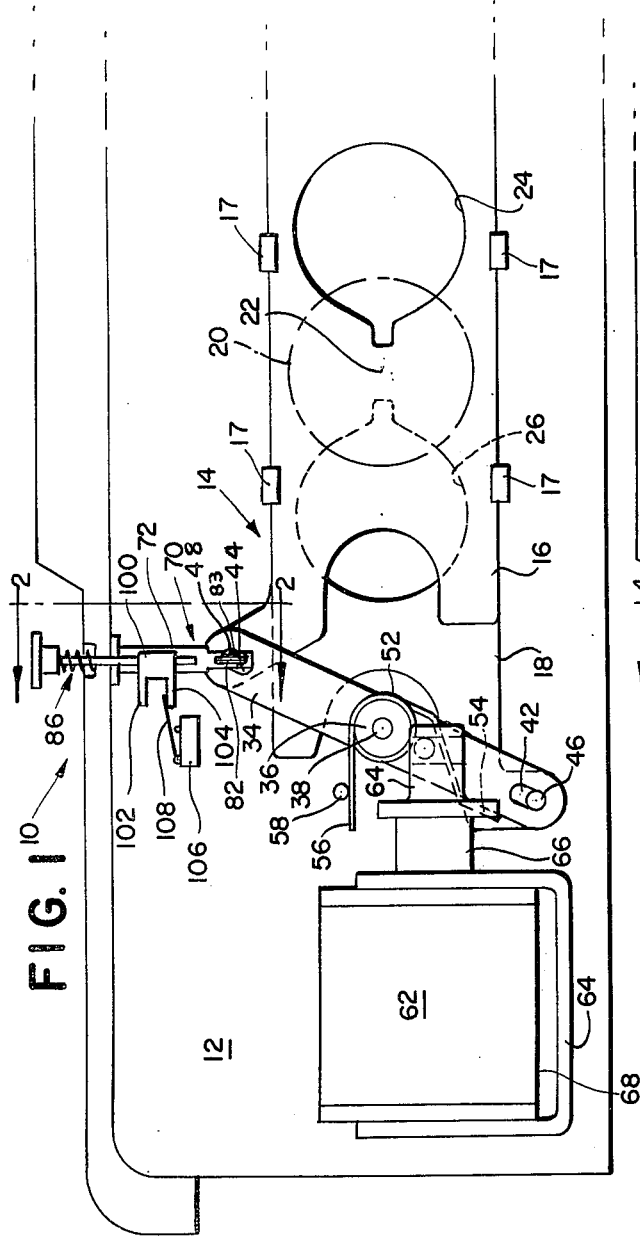
FIG. 1 is a diagrammatic, fragmentary, front elevational view of an exposure control system incorporating features of the instant invention, the view having portions broken away or removed to reveal internal structure.

Referring to FIG. 1, the basic components of a shutter-diaphragm exposure mechanism are revealed in detail as they are present within an exposure housng 10. Mounted upon a rear casting 12 of the housing 10, an exposure blade mechanism, shown generally at 14, is formed having two cooperatively moving shutter-diaphragm blades 16 and 18. Blades 16 and 18 slide horizonatally within mounting brackets depicted at 17 along a given blade path (not shown) across an aperture 20 defining the entrance of the camera optical path depicted at 22. Each of the blades, 16 and 18, is formed having a selectively shaped main opening, respectively depicted at 24 and 26, movable across the optical path of the camera 22 to symmetrically overlap thereat and thereby define selectively varying, main or primary aperture values. Each blade, 16 and 18, additionally includes a corresponding photocell sweep opening, (not shown) which moves in correspondence with the respective main aperture openings 24 and 26 to define secondary aperture values over the path of a photocell (not shown) forming an active element of a light-integrating network 32 depicted in FIG. 6. A suitable light-integrating network is described in U.S. Pat. No. 3,620,143.

When displaced, as later explained, blades 16 and 18 define a continuous progression of apertures over both optical path 22 and the photocell (not shown) as a result of their mutual connection wth a walking beam as shown at 34. Walking beam 34 is formed having a centrally disposed hub portion 36 which is journaled for rotation about an upstanding stud (not shown) fixed within and extending from rear casting 12. A pin 38 secures the hub portion 36 over the above-noted upstanding stud. Elongate slots, as at 42 and 44, are formed in the outward tip portions of beam 34 for the purpose of providing connection with studs or pins 48 and 46 extending, respectively, from blades 16 and 18. As later explained in detail with regard to FIGS. 2 and 4, the pin 48 is a T shaped element employed for latching the blades in their closed orientation.

The beam 34 is mechanically biased for counterclockwise rotation tending to displace the blades 16 and 18 from a blocking position (shown in FIGS. 1 and 2) wherein openings 24 and 26 are out of registration to an open orientation shown in FIG. 5 by means of a spring 52, the central portion of which is wound about the hub 36. The movable end 54 of the spring 52 being configured for biased contact against the beam 34, while its stationary end 56 is configured to abut against a pin 58 extending from the rear casting 12. With the spring 52 so connected, the exposure mechanism is biased for movement toward an open orientation as illustrated in FIG. 5.

Figure 3:
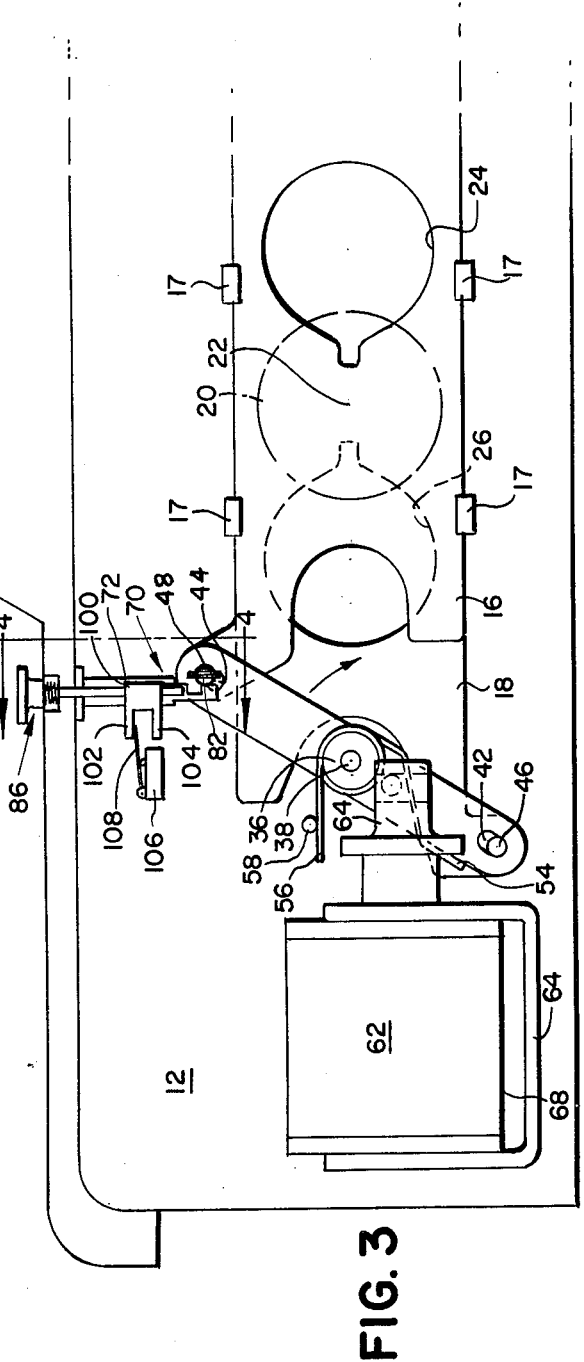
FIG. 3 is a front elevational view of the exposure mechanism of FIG. 1 showing the orientation of the components thereof during initiation of an exposure cycle.

Clockwise rotation of the beam 34 and resultant movement of blades 16 and 18 (as shown in FIG. 3) into a closed orientation blocking the passage of light along the optical path of the camera 22 is carried out by an electromagnetic drive operative to provide a driven mode of operation. This electromagnetic drive is present as a solenoid 62 mounted upon rear casting 12 by bracket 64. The solenoid 62 includes an internally disposed cylindrical plunger 66 which retracts inwardly into its spiral winding and associated casing 68 upon energization thereof. When solenoid 62 is so energized, walking beam 34 is rotated clockwise to move blades 16 and 18 into the terminal blocking position shown in FIG. 3.

Hence, it should be understood that the spring 52 provides means for biasing the blade mechanism 14 to an open position whereas the solenoid 62 provides means actuatable to displace the blades to their terminal blocking position. Together these provide means actuatable for displacing the blades from a closed to an open position and back again so as to define an exposure interval during which scene light is transmitted along the optical axis 22 to the camera focal plane (not shown).

Figure 2:
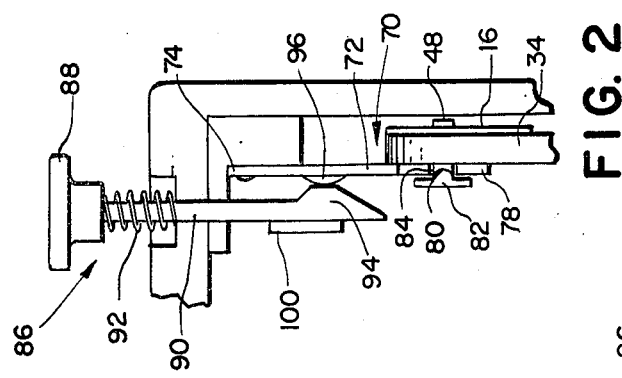
FIG. 2 is an enlarged sectional view taken along the line 2—2 of FIG. 1 to illustrate the latch portion of the exposure mechanism of the latter figure.

Although the blades 16 and 18 are biased in an opening direction, the exposure mechanism 14 is held in a closed orientation by means of a latch 70, shown in detail in FIG. 2, which retains the blades in a latched, blocking position (shown in FIG. 1) when the camera is not undergoing an exposure cycle. As later explained in detail with regard to the overall system operation, the terminal blocking position (see FIG. 3) is shifted slightly in the blocking direction from the latched, blocking position of FIG. 1.

The latch 70 includes a latch arm or leaf spring 72 having one end 74 secured by a fastener such as a rivet 76 to the rear casting 12 while the free end 78 is located in overlying relation to the one end of the beam 34 so as to be located at appropriate times in the path of travel of the blade pin 48 which extends through the beam 34. The latch arm 72 is bent or formed so that the free end 78 is biased perpendicular to blade travel so that in a released condition, as later explained with regard to FIGS. 2 and 4, the free end is located out of the line of travel of the blade pin 48.

As previously indicated, the blade pin 48 is a T-shaped member having a shank 80 and an enlarged head or crossbar portion 82 which cooperates with a detent 84 in the free end of the latch arm 72 to retain the latch arm until blade actuation. Consequently, as later described in detail with regard to overall operation of the exposure mechanism, the latch 70 is not actually released until the blades 14 have been actuated.

In this arrangement, the pin 48 functions to both hold the latch in its latching position (at least after latch enablement) and to engage the latch to prevent the blades from opening. Hence, the blade pin 48 in combination with the latch detent 84 provide cooperating means of the latch and blades for precluding latch release while the blades remain in their latched location or, that is, prior to blade activation, and also provide means carried by the blades for engaging the latch to preclude blade movement in the opening direction.

Initial control over the latch arm 72 is provided by an actuator 86 which includes a pushbutton 88 and an elongated member or push rod 90 slideably mounted on casting 12. A spring 92 biases the push rod 90 upwardly, as shown in FIGS. 1 and 2, to an off position wherein a stepped or offset cam 94 of the rod bears against an offset or bump 96 of the latch arm 72 so as to hold the latter in a locked position against the spring load wherein its free end 78 is held in the blade path. In the latter position of the latch 70, the blades 14 cannot be displaced further in the opening direction than the latched position shown in FIG. 1.

Extending laterally from the push rod 90, as shown in FIG. 1, is a switch control member 100 which provides upper and lower arms 102 and 104 designed to operate an electrical control switch 106 fixedly mounted on the casting 12. The upper and lower arms 102 and 104 are spaced from each other and from the push rod offset 94 to activate and de-activate the switch 106, as explained in detail below, in a timed relation to locking and unlocking of the latch arm 72.

Figure 4:
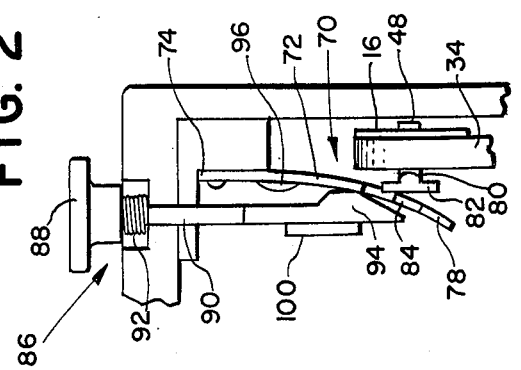
FIG. 4 is an enlarged sectional view taken along the line 4—4 of FIG. 3.

Hence, as later explained in detail with regard to the exposure system operation, the latch is both unlocked by and subsequently returned to and locked in its latching position by the push rod 90, but actually released by electrical actuation of the blade mechanism 14; more particularly by energization of the solenoid 62 to draw the blades 16 and 18 slightly further in a closing direction from the latched position shown in FIG. 1 to the terminal blocking position shown in FIG. 3 wherein the beam 34 and the blade stud 48 are displaced laterally from the latch end 78 thereby releasing the latter to its unloaded position in which it is displaced perpendicular to the blade path as shown in FIG. 4. To accomplish this end, the opening and closing of the switch 106 is in timed relation to the unlocking of the latch arm 72 as explained below.

The switch 106 is a drag switch or the like having an acutating lever or arm 108 which requires a predetermined force to displace it between a de-activated or off position (shown in FIG. 1) and an activated or on position shown in FIG. 3. As previously indicated, operation of the switch is controlled by the member 100. In this respect, the upper arm 102 is preferably arranged in relation to the switch 106 and the cam 94 so as to engage and displace the switch lever 108 from its off position of FIG. 1 just subsequent to displacement of the cam 94 off the latch arm bump 96 or, that is, just following unlocking of the latch so as to insure that the electrical actuation of the system follows the mechanical actuation (unlocking) of the latch.

Conversely, when the pushbutton 88 is released, the mechanical actuation (relocking) of the latch 72 preferably just precedes de-activation of the switch 106. That is, the lower arm 104 is spaced from the upper and arranged with respect to the switch 106 and the latch cam 94 so as to displace the switch lever 108 to its off position subsequent to engagement of the cam 94 which displaces the latch 70 to its locked position in the blade path.

As noted below with regard to the operation of the camera, the system automatically continues through a complete cycle once the switch 106 is closed. However, since the operator can release the pushbutton 88 prior to completion of the exposure cycle (or, that is, prior to return of the blades 16 and 18 to their blocking position), the latch arm 72 may be returned to its latching position in the blade path while the blades are in the open position shown in FIG. 5. To accommodate the latter, the blade pin 48 carries a cam angle or surface 83 on its trailing edge as viewed with respect to the opening direction; the cam surface 83 tending to displace the latch arm from its latch position as the blades are closed so that the blade pin 48 may pass the latch in the closing direction (to the right in FIG. 5) and then be precluded from again opening.

Figure 6:
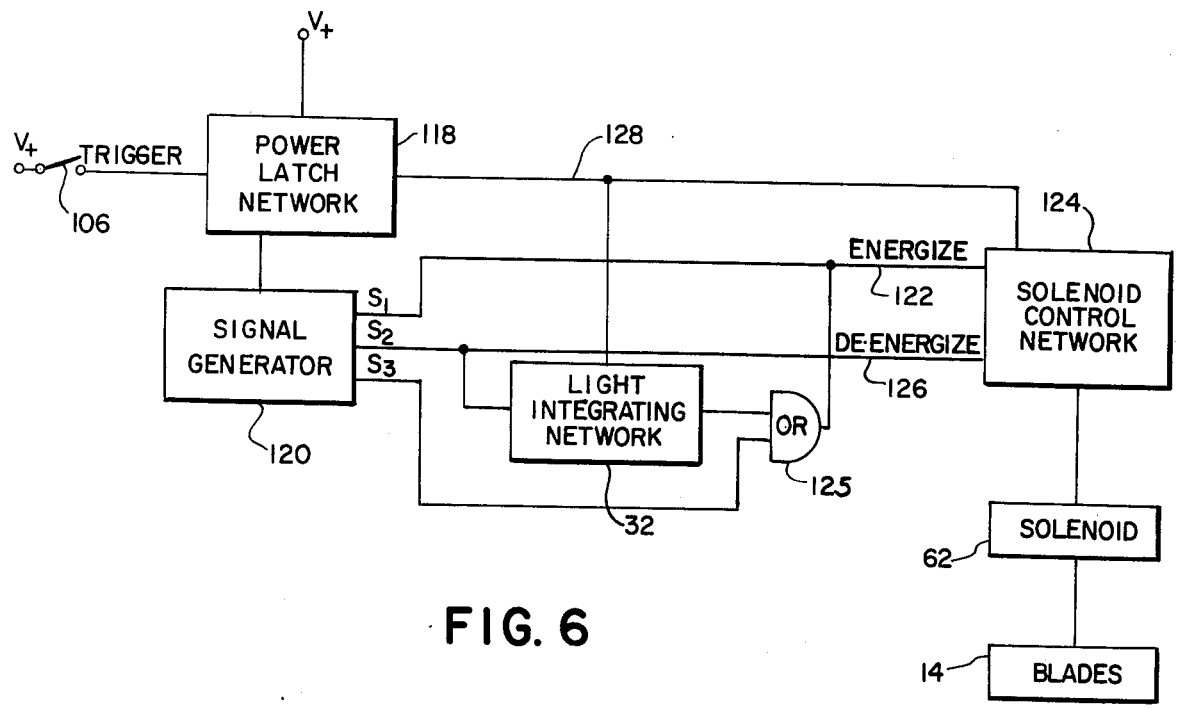
FIG. 6 is a block diagram showing the functional circuit relationships of the control system shown in FIG. 1.

An exemplary electrical circuit employed in the exposure control system will now be described with regard to FIG. 6. Therein, a power latch network 118 is shown in connection to the switch 106 which in its on condition triggers the network 118 to activate a signal generator 120 which produces signals designated $S_1$, $S_2$ and $S_3$. At this time, the light-integrating network 32 and a solenoid control network 124 are also energized or coupled to the power source by the network 118 through a line 128. The latter network may take the form of a flip-flop network which maintains power to the system until the cycle is complete and the switch 106 is released. Similarly, the network 124 may also take the form of a flip-flop network which assumes one or two stable states to open or close the circuit between line 128 and the solenoid 62 and either energize or de-energize the latter in accordance with signals on the input line 122 or 126, respectively. Initially, the signal generator 120 produces the $S_1$ signal which places the network 124 in a solenoid energizing mode through the line 122. Just following the $S_1$ signal, which further closes the shutter blade mechanism 14 so as to complete the release of the latch, the generator 120 produces a second signal $S_2$ which, through line 126, operates the solenoid control network 124 to de-energize the solenoid 62 and allow opening of the blades 16 and 18 thereby initiating the exposure interval. As shown in this figure, the light-integrating circuit 32 is also activated at this time; however, the latter could have been previously activated, for example, directly by network 118, since the blades 16 and 18 hold the photocell (not shown) in a darkened condition until initiation of the exposure interval as explained in detail in the aforementioned U.S. Pat. No. 3,820,128.

When sufficient light has been received by the photocell (not shown) of the network 32, the latter passes a signal through an "or" gate 125 to the line 122 so as to again energize the solenoid 62 and thereby return the blade mechanism 14 to a closed position which terminates the exposure interval. After a sufficient period of time, greater than the longest expected exposure interval, the generator 120 produces a fail safe signal $S_3$ which will also energize the solenoid to terminate the interval when the scene light is inadequate to trip the light-integrating network 32.

Prior to completing the description of the system operation, it should be noted that while only the exposure cycle is herein described, the system is applicable to many different camera arrangements which have events occurring both before and after the exposure. Events occurring before the exposure cycle will determine how soon the signal generator produces its initial signal $S_1$ while events occurring after the exposure cycle will determine when the power latch network releases. For example, the illustrated system may be employed to modify the camera described in the aforementioned U.S. Pat. No. 3,820,128 for use as a non-SLR camera. In such an arrangement, the $S_2$ signal follows the $S_1$ signal by a time delay sufficient to ensure that the exposure chamber has been placed in condition for exposure.

For general use, however, the signal generator 120 may provide the $S_1$ signal just following energization by the power network 118 with the $S_2$ signal then following by a few milliseconds, preferably allowing enough time for complete energization of the solenoid 62 so as to ensure release of the latch arm 72 to its open position. On the other hand, the $S_3$ signal preferably follows the $S_2$ signal by at least 30 milliseconds so as to always permit completion of conventional exposure interval.

With regard to energization or powering up of the system, it has previously been indicated that the network 118 may take the form of a flip-flop network which maintains power to the system until the cycle is complete. That is, once the power network 118 is activated by the switch 106, it remains on until it receives both a shut down signal (for example a fourth signal from the generator 120, just following $S_3$, or from the other elements of the camera) and the switch 106 is opened. Hence, if the pushbutton 88 is released before completion of an exposure, the system will continue until it shuts itself down at which time the solenoid is released and the blades captured by the latch 70. Conversely, if the pushbutton 88 is held down beyond the time necessary to complete a full cycle, the network 112 and the solenoid 62 remain energized until the operator releases the button which re-sets the latch 70 and opens the switch 106; at which time the blades are captured by the latch 70.

The overall operation of the exposure control system will now be explained. As the camera operator depresses the pushbutton 88, the push rod 90 moves downwardly from the position shown in FIGS. 1 and 2 to the position shown in FIGS. 3, 4 and 5. In the initial stage of this downward stroke, the push rod cam 94 drops off the latch bump 96, thereby unlocking or, that is, enabling the latch for release. Just subsequent to displacement of the cam 94 from the bump 96, the switch 106 is rendered conductive as its lever arm 108 is displaced to the "on" position by the switch actuator arm 102.

Turning "on" of the switch 106 triggers the network 118 to power up the system. Following the latter, the signal generator 120 activates the solenoid 62. This rotates the walking beam 34 clockwise from its latched blocking position of FIG. 1 to its terminal blocking position shown in FIG. 3 which carries or displaces the stud 48 out of the latch detent 84 thereby releasing the latch 70 so that its free end 78 is, in turn, displaced out of the blade path to the position shown in FIG. 4. Consequently, when the signal generator 120 generates $S_2$, the network 124 then de-energizes the solenoid 62 such that the blades 16 and 18 are driven under the bias of the spring 52 in an opening direction to define progressively increasing aperture values (one of which is designated at 28 in FIG. 5) over the optical path 22 so as to transmit light to the focal plane and thus initiate the exposure interval.

Coincident with the progressive opening of the main aperture, a secondary aperture (not shown) is opened in tracking relation as set forth in the aforementioned U.S. Pat. No. 3,820,128 so as to define a suitable exposure value. When sufficient scene light has been summed by the light-integrating network 32, the latter energizes the solenoid 62 to drive the blades back to the terminal blocking position shown in FIG. 3 thereby terminating the exposure interval.

This final energization of the solenoid 62 not only drives the blades 16 and 18 to their terminal blocking position shown in FIG. 3 but also holds the blades in that position until the power latch network 118 turns off. In this regard, it should be noted that since the above exposure sequence occurs very rapidly, at its completion the pushbutton 88 will generally still be in a depressed condition with the latch end 78 biased out of the blade path. Then as the operator releases the pushbutton 88, which returns to its normally off location under the urging of the spring 92, the push rod 90 first displaces its cam 94 into contact with the latch arm bump 96 to displace the free end 78 if the latch arm 72 into the blade path and then secondly renders the switch 106 non-conductive as the lower acutator arm 104 engages and lifts the switch lever 108 to its off position shown in FIG. 1. Where the network 118 has already noted the end of the cycle, the turning off of the switch 106 alters the network 118 to its off state and cuts power to the remainder of the circuit which de-energizes the solenoid 62 allowing the blades to again move in an opening direction into engagement with the latch 70. Hence, the blades are then held in their latch position (shown in FIG. 1) in a de-energized, stable, light-blocking orientation in accordance with the spring bias of the blades against the latch 70. In this arrangement, the solenoid control network 124 is automatically re-set to its solenoid de-energizing mode when network 118 switches off, however, it should be noted that the network 124 could remain in the opposite state and the $S_1$ signal eliminated.

For system operation, where the pushbutton 88 is released before the exposure cycle is complete, the latch 70 will be in its latching position as the blades are closed. As previously indicated, the pin 48 carries a cam face 83 on its trailing edge, as viewed in terms of the opening movement of the blades 16 and 18, which during the closing movement cams the latch arm 72 slightly out of its latch position thereby allowing the blade to pass the latch arm 72 and reach the terminal blocking position shown in FIG. 3. Since the switch 106 is at this time in its off position, the power latch network 118 automatically re-sets to the standby condition which cuts power to the remainder of the circuit thereby releasing the blades to their latch position.

Figure 7:
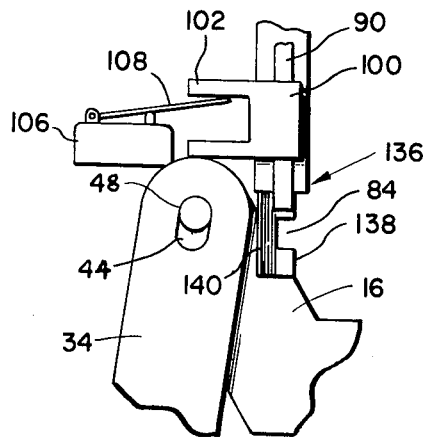
FIG. 7 is a front elevational view of an alternate embodiment of the latch arrangement shown in FIG. 1.

It should be noted that the cam surface 83 which cams the latch out of the way may alternately be provided on the latch itself, as shown in FIG. 7 where a latch 136 comprises a latch arm 138 identical to the previously described latch 70 except for the addition of an outwardly turned cam edge 140 which is inclined to the blade path so as to cooperate with the blade pin 48 to drive the latch arm from its latch position as the blades close. Hence, the cam surface, whether on the pin or the latch, provides cooperating means on the latch and the blades for urging the latch from its latch position responsive to displacement of the blades to their blocking orientation.

Advantageously, the described arrangement allows use of a substantially identical exposure blade structure and circuit control for either SLR or non-SLR operations. In the former case, the initial energization of the solenoid being employed to terminate the viewing mode and allow conversion of the exposure chamber to the exposure mode while in the present arrangement the initial pre-exposure energization is employed to complete latch release. Consequently, the circuit arrangement and the electronic control of the system, with the exception of the timed relation of the actuator switch to the latch may be quite similar for each use.

Those familiar with the photographic arts will readily appreciate the novel and highly unique advantages of the invention wherein a latched shutter arrangement is released in response to electrical actuation of the light regulating elements and, hence, provides a highly stable, non-powered shutter condition while retaining complete electrical control over the shutter movement.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. A photographic camera system having means for mounting photographic film material at a given focal plane, said system comprising:
   a blade mechanism;
   means for mounting said blade mechanism for displacement between at least one blocking arrangement precluding transmission of scene light to the focal plane and an unblocking arrangement defining at least one aperture value structured for transmission of scene light to the focal plane;
   drive means actuable for displacing said blade mechanism between its said arrangements;
   latching means for initially retaining said blade mechanism in one of its said arrangements;
   means for actuating said drive means to effect the displacement of said blade member from its said arrangement wherein it is retainable by said latching means to another of its said arrangements and then back to its said arrangement wherein it is retainable by said latching means to define an exposure cycle of said blade mechanism, said latching means being structured to be responsive to said actuation of said drive means to effect its release of said blade mechanism to facilitate the movement of said blade mechanism under the influence of said drive means to define said exposure cycle.

2. The system of claim 1 wherein said drive means includes electrically energizeable means, and said latching means includes means for releasing said blade mechanism responsive to energization of said drive means.

3. The system of claim 1 wherein said drive means includes electrically energizable means for displacing said blade mechanism in at least one direction away from said other arrangement and said actuating means includes means for enabling said latching means for subsequent release and means for energizing said drive means at or just subsequent to enabling of said latching means.

4. The system of claim 1 wherein said drive means includes electrically energizable means for displacing said blade mechanism from its said other arrangement toward its said arrangement, wherein it is retainable by said latch, and said actuating means includes means displaceable between a first position wherein said drive means is de-energized and said latching means is locked in a latching arrangement and a second position wherein said drive means is energized and said latching means is enabled for release and means for sequentially enabling said latching means for release and then energizing said drive means as said actating means is displaced toward its said second position and for then sequentially locking said latching means in its said latching arrangement and then de-energizing said drive means as said actuating means is displaced back to its said first position.

5. The system of claim 1 wherein said latching means precludes displacement of said blade mechanism in one direction towards its said unblocking arrangement, said latching means is responsive to displacement of said blade mechanism in the opposite direction to release said blade mechanism from the retaining influence of said latching means, and said means for actuating said drive means includes means for initially actuating said drive means to displace said blade mechanism in said opposite direction so as to release said blade mechanism and subsequently actuating said drive means to displace said blade mechanism from its said blocking arrangement to its said unblocking arrangement and back again to define an exposure interval during which scene light is transmitted to the focal plane.

6. The system of claim 1 wherein said latching means includes a latch member configured for displacement between a first position wherein said latch member is located for engagement with said blade mechanism so as to preclude movement thereof at least in a direction towards said unblocking arrangement and a second position wherein said latch member is displaced from engagement with said blade mechanism.

7. The system of claim 1 wherein its said other of said arrangements of said blade mechanism is said unblocking arrangement, said mounting means mounts said blade mechanism for movement between two blocking arrangements, the first of said blocking arrangements being said arrangement wherein it is retainable by said latch and the second of said blocking arrangements being an arrangement wherein said blade mechanism is further displaced away from its said unblocking arrangement than when in its said first blocking arrangement and the release of said blade mechanism by said latching means is responsive to a displacement of said blade mechanism from its said first blocking arrangement to its said second blocking arrangement.

8. The system of claim 1 wherein said mounting means mounts said blade mechanism for movement to a third arrangement in addition to said arrangement wherein it is retainable by said latching means and its said other arrangement, said third arrangement being an arrangement wherein said blade mechanism is further displaced away from its said other arrangement, than when in its said arrangement wherein it is retainable by said latch and the release of said blade mechanism by said latching means is responsive to a displacement of said blade mechanism from its said arrangement wherein it is retainable by said latch to its said third arrangement.

9. A photographic camera system having means for mounting photographic film material at a given focal plane, said system comprising:
a blade mechanism;
means for mounting said blade mechanism for displacement between at least one light-blocking position precluding transmission of scene light to the focal plane and an unblocking position defining at least one aperture value configured for transmission of scene light to the focal plane;
means for biasing said blade mechanism in a given direction toward said unblocking position;
drive means actuatable for displacing said blade mechanism in an opposite direction toward said blocking position;
means precluding displacement of said blade member in said given direction;
means for disabling said precluding means responsive to actuation of said drive means; and
selectively operable means for initiating and subsequently terminating an exposure interval during which scene light is transmitted to the film material located at the focal plane, said interval initiating and terminating means including selectively operative control means for initially actuating said drive means to displace said blade mechanism and disable said precluding means, for then de-actuating said drive means so as to allow displacement of said blade mechanism to said unblocking position responsive to said biasing means thereby initiating the exposure interval, and for subsequently again actuating said drive means to return said blade mechanism to said blocking position so as to terminate said interval.

10. The system of claim 9 wherein said control means includes means for enabling said precluding means following said subsequent actuating of said drive means.

11. The system of claim 9 wherein said drive means is electrically energizable and said control means includes means for selectively energizing and de-energizing said drive means.

12. A photographic camera havng means for mounting photographic material at a given focal plane and means for directing image-carrying rays from a scene along a given optical path to the focal plane, said system comprising:
a blade mechanism;
means for mounting said blade mechanism for displacement along a given blade path between a blocking orientation precluding transmission of scene light along the given optical path and an unblocking orientation defining at least one aperture value configured for transmission of scene light along the given optical path;
drive means actuatable for displacing said blade mechanism between said blocking and unblocking orientations;
means for actuating said drive means to displace said blade mechanism between said blocking and unblocking orientations; and
latching means for initially retaining said blade mechanism in said blocking orientation, said latching means including means responsive to limited displacement of said blade mechanism within its said blocking orientation for releasing said blade mechanism to facilitate subsequent displacement of said blade mechanism towards its unblocking orientation.

13. The apparatus of claim 12 wherein said latching means includes a latching member displaceable between a first position wherein said latching member is located in said blade path and precludes displacement of said blade mechanism from its said blocking orientation and a second position wherein said blade mechanism is displaced out of said blade path, and means for biasing said latching member to its said second position, and said blade mechanism and said latching member including cooperating means for precluding displacement of said latching member to its said unblocking orientation.

14. The apparatus of claim 12 wherein said latching means includes a latching member displaceable between a first position wherein said latching member is located in said blade path and precludes displacement of said blade mechanism from its said blocking orientation and a second position wherein said blade mechanism is displaced out of said blade path and means for biasing said latching member to its said second position, and said blade mechanism and said latching member including cooperating means for camming said latching member from its said first position when said blade mechanism is displaced toward its said blocking orientation.

15. The apparatus of claim 12 wherein said latching means includes a latching member displaceable between a first position wherein said latching member is located in said blade path and precludes displacement of said blade mechanism from its said blocking orientation and a second position wherein said blade mechanism is displaced out of said blade path, and said blade mechanism and said latching member including cooperating means for camming said latching member from its said first position responsive to displacement of said blade mechanism toward its said blocking orientation.

16. Th apparatus of claim 12 wherein said drive means includes means for biasing said blade mechanism in a one direction toward its said unblocking orientation and energizeable means for displacing said blade mechanism in an opposite direction toward said blocking orientation, said latching means includes a latching member displaceable between a first position wherein said latching member precludes displacement of said blade mechansim in said on direction from said blocking orientation and a second position wherein said latching member permits displacement of said blade mechanism in either direction, and said blade mechanism and said latching means includes cooperating means for camming said latching means from its said first position to permit passage of said blade mechanism responsive to displacement of said blade mechanism in said opposite direction.

17. The system of claim 16 wherein said blade mechanism carries a lug member configured to engage said latch member, said lug member having a cam surface on one side thereof, said cam surface being configured to engage and displace said latch member from its said first position as said latch mechanism is displaced toward its said blocking orientation.

18. The system of claim 17 wherein said means for actuating said system includes means for enabling said latching means for release and means for subsequently actuating said drive means to release said latching means and to initiate an exposure interval during which scene light is transmitted to the focal plane.

19. The system of claim 17 wherein said latching means includes a latch member displaceable between a first position wherein said latch member is configured for precluding displacement of said blade mechanism in one direction and a second position removed from said blade mechanism wherein said latch member allows displacement of said blade mechanism in at least said one direction, said drive means including electrically energizable means for displacing said blade mechanism in at least the direction opposite said one direction, said blade mechanism includes means for precluding displacement of said latch member to its said second position when said blade mechanism is in a latched position and for releasing said latch member as said blade mechanism is displaced responsive to initial energization of said drive means, and said actuating means includes means displaceable between a first position wherein said drive means is de-energized and said latch means is locked in its said first position and a second position wherein said drive means is energized and said latch means is enabled for displacement to its said second position.

20. A photographic exposure control system for a photographic camera, the camera having means for mounting photographic film material at a given focal plane, said system comprising a blade member, means for mounting said blade member for displacement along a given blade path between a light-blocking position precluding transmission of scene light to the focal plane and an unblocking position defining at least one aperture value configured for transmission of scene light to the focal plane, means for biasing said blade member in one direction along said blade path toward said unblocking position, drive means actuatable for displacing said blade member in a opposite direction along said blade path toward said blocking position, a latch, means for mounting said latch for displacement between a first position wherein said latch is in engagement with and precludes displacement of said blade member in said one direction and a second position wherein said latch permits displacement of said blade member in either direction, means for biasing said latch toward its said second position, and said blade and said latch including cooperating means for precluding displacememt of said latch from its said first position so long as said blade member remains in engagement with said latch.

* * * * *